United States Patent [19]
Chen

[11] Patent Number: 5,583,686
[45] Date of Patent: Dec. 10, 1996

[54] LENS ASSEMBLY INSTALLATION OF SCANNER

[75] Inventor: James Chen, Nantow, Taiwan

[73] Assignee: Spot Technology Inc., Hsin Chu, Taiwan

[21] Appl. No.: 471,091

[22] Filed: Jun. 6, 1995

[51] Int. Cl.$^6$ ........................................................ G02B 7/02
[52] U.S. Cl. .......................... 359/198; 359/210; 359/819; 359/821
[58] Field of Search .................................... 359/196–203, 359/209, 210, 809, 811, 813, 819, 821, 822

[56] References Cited

U.S. PATENT DOCUMENTS

| | | | |
|---|---|---|---|
| 1,118,187 | 11/1914 | Depue | 359/819 |
| 5,157,430 | 10/1992 | Ogawa | 359/811 X |
| 5,241,424 | 8/1993 | Watanabe | 359/811 |

Primary Examiner—John D. Lee
Attorney, Agent, or Firm—Jacobson, Price, Holman & Stern, PLLC

[57] ABSTRACT

A lens assembly installation of scanner comprises a sliding base being movable inside the scanner horizontally and longitudinally on which is disposed a projection lamp, a light filtering lens assembly and a camera. Characterized in that the light filtering lens assembly includes a stepping motor, a support plate, a lens bracket and four pieces of lens, wherein the lens bracket shaped as a circular arc wherein four windows are disposed one-by-one parallelly has a plurality of screw holes disposed at the top. An opening at the top rim of the window and a U-channel, to accommodate the lens, in the inner rim of the window are provided. The support plate is provided with a shaft hole by which it can be fixed onto the stepping motor shaft and several small holes and projected hold-down plate are provided at its outer rim corresponding respectively to the screw holes on the lens bracket and window which can be locked with the lens bracket to form an integrated unit. This invention simplifies the assembly and the transmission of the light filtering lens assembly.

1 Claim, 4 Drawing Sheets

LENS ASSEMBLY INSTALLATION OF SCANNER

BACKGROUND OF THE INVENTION

The present invention relates to a lens assembly installation of scanner, more particularly to all improvement of a light filtering lens assembly in the lens assembly inside the scanner to simplify the structural construction and the transmission method of the whole to achieve the reduction of the production cost.

Referring to FIG. 4, according to the construction of the light filtering lens assembly in the lens assembly of the conventional scanner, it consists of a stepping motor 31, a sectorial lens bracket 35, four pieces of lens and four pieces of metallic lug piece in which the front rim end face appears in a circular arc with four windows 351 provided, the front face of each window 351 is provided with a subsided step face 352 with lug holes 353 and 354 provided one each at the top and bottom rims of the window 351 so that the lens 34 can be placed inside the step face 352 and then hooked into the top and bottom lug holes 353 and 354 on the window 351 with the top and bottom end lugs 361 and 362 of the metallic lug piece 36 respectively and assembled into an integral by virtue of the hold-down plate 363 provided at the mid section of the metallic lug piece 36 pressing on the lens 34. In addition, at the location where the inner side of the support plate 355 is near to the window, an inner toothed gear sector is provided with a shaft hole 357 furnished at the other end and by virtue of this hole, the sectorial lens bracket is fixed onto the slide base. The stepping motor 31 is then fixed to the downside of the shaft hole 357 and drives by gearing between the pinion 312 on top of the motor 31 with the inner toothed gear sector 356 through the idler 313. As the generally known construction mentioned above, there is no way to complete fixing it once when assembling the lens 34. As the requirement for the cleanliness of the lens 34 is extremely high and untouchable by hand and the sizes of the components are very small, therefore it is rather difficult to assemble them and due to the incorporation of the lugs 361 and 362 of the metallic lug piece 36 and lug holes 353 and 354 is a loose fit, the lens 34 still can produce sway and unsteady situation after fixing the whole assembly affecting the quality of the product. So far as the cost is concerned, the commonly known light filtering lens assembly with the construction of an inner toothed gear sector 356 fixed at the inside of its sectorial lens bracket 35 further causes the cost to become higher due to its precision being harder to grasp, the idler 313, pinion 312, metallic lug piece 36, etc., have still to be manufactured and above additional higher difficulty of the relevant procedure of assembly which altogether will create shortcomings like the increase of integral manufacturing cost, being nonbeneficial to industrial competition, etc.

SUMMARY OF THE INVENTION

It is the object of the present invention to provide a scanner lens assembly installation which is capable of making the assembling work faster and easy for implementation.

It is another object of the present invention to provide a scanner lens assembly installation which is capable of simplifying the quantity and manufacture of parts and components to save installation cost further.

In order to achieve the objects set forth, the lens assembly installation of scanner comprises mainly a slide base, and a projection lamp, a light filtering lens assembly and a camera mounted on the slide base. The slide base can move inside the scanner to and fro horizontally and longitudinally. Characterized in that the light filtering lens assembly includes a stepping motor, a support plate, a lens bracket and four pieces of lens. The lens bracket is shaped as a circular arc wherein four windows are disposed one-by-one parallelly. An opening is provided at the upper rim of the window and a U-channel is provided in the inner rim of the window to accommodate the lens. Further, a few screw holes are provided at the top rim of the lens bracket. A shaft hole is provided on the suport plate by which the support plate is fixed onto the stepping motor shaft. There are a few small holes provided at the outside rim of the support plate corresponding to the screw holes on the lens bracket. In addition, a plurality of projected hold-down plates corresponding to the windows are locked with the lens bracket. Accordingly, the present invention is capable of completing more easily the assembing of the light filtering lens assembly and drive it.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
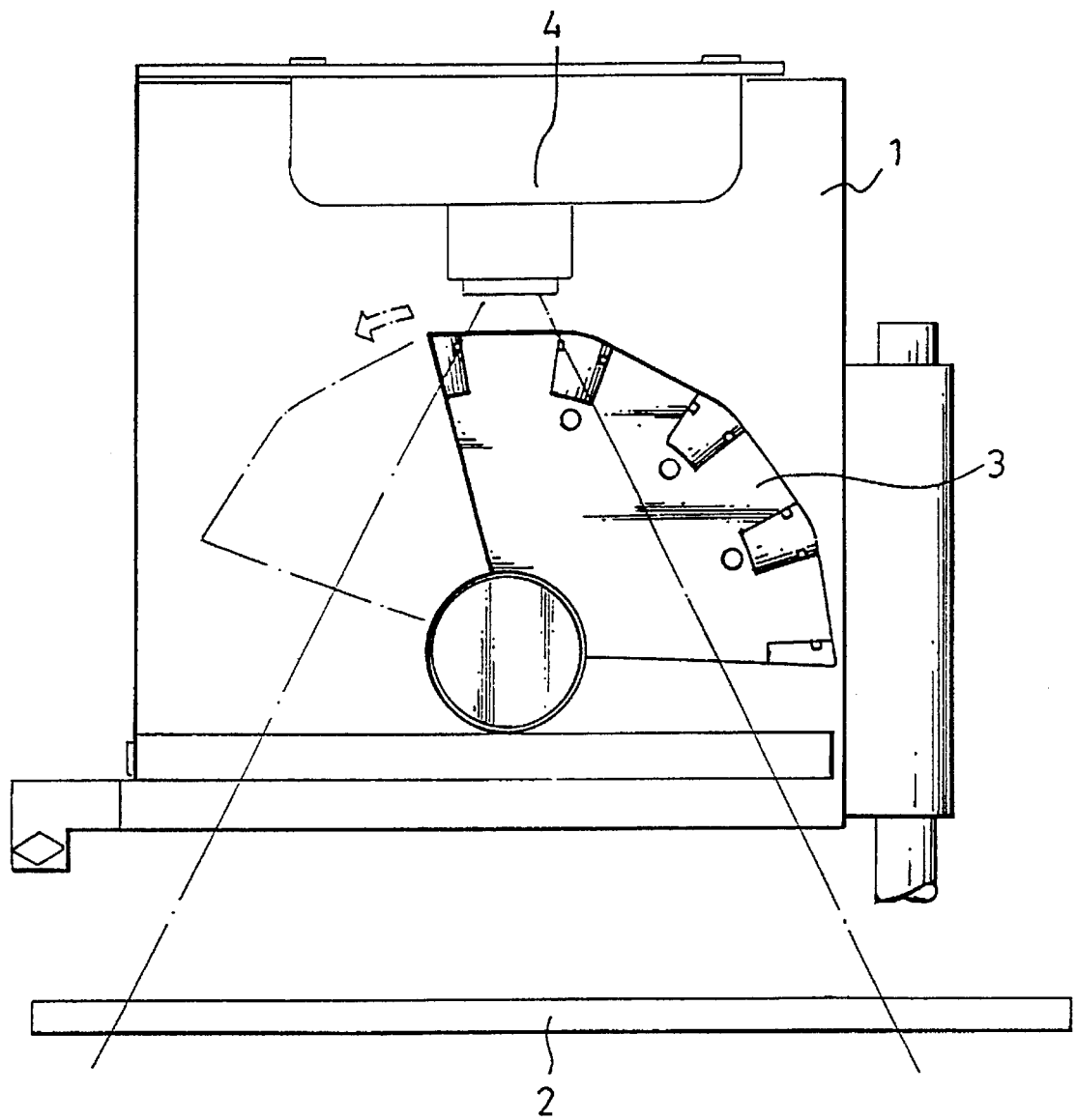
FIG. 1 is the top elevational view of the lens assembly installation of scanner according to the preferred embodiment of the present invention.

Referring to FIG. 1, the lens assembly installation of scanner comprises a slide base 1, on which a projection lamp 2, a light filtering lens assembly 3 and a camera 4 are mounted. The slide base 1 is the type that can move to and fro horizontally and longitudinally inside the scanner body.

Figure 2:
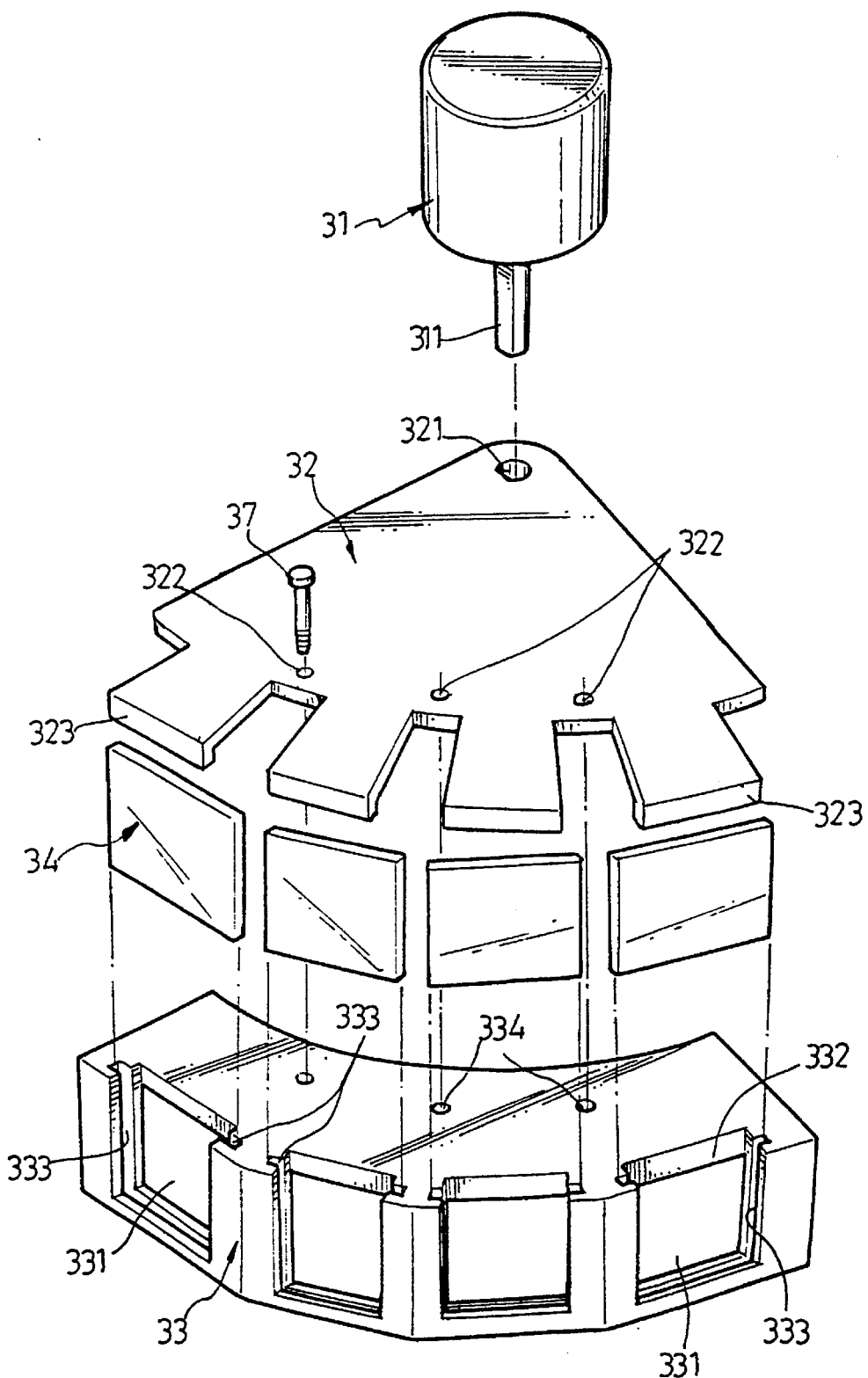
FIG. 2 is an exploded view of the lens assembly installation of scanner according to the present invention shown in FIG. 3.
Figure 3:
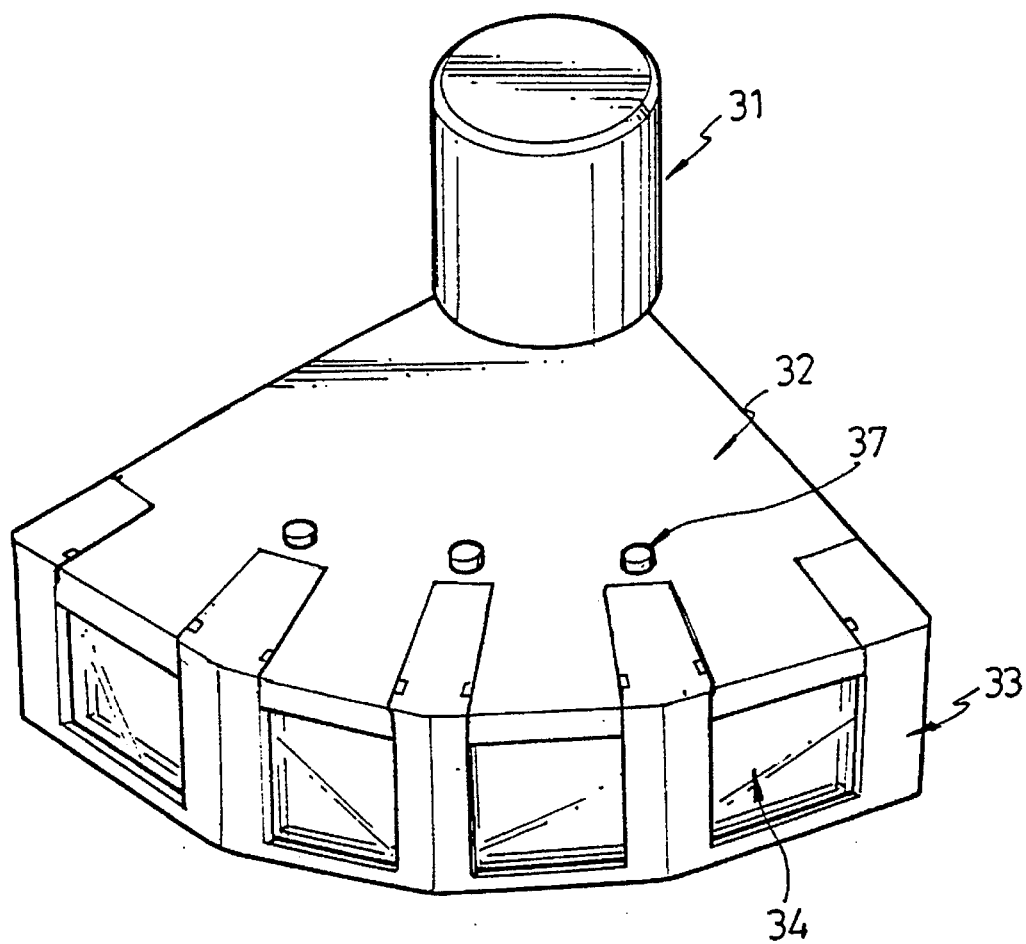
FIG. 3 is an assembly view of the lens assembly installation of scanner according to the present invention.

Referring to FIGS. 2 and 3, the main feature of the present invention is the light filtering lens assembly 3 which includes a stepping motor 31, a support plate 32, a lens bracket 33 and four pieces of lens 34. The lens bracket 33 is shaped in a circular arc wherein four windows 331 are disposed one-by-one parallelly. An opening 332 is provided at the upper rim of the window 331 and a U-channel 333 to accommodate the lens 34 is provided at the inner rim of the window 331. A plurality of screw holes 334 are provided at the top rim of the lens bracket 33. The stepping motor 31 has a shaft 311. The support plate 32 has a shaft hole 321 by which the support plate 32 is fixed onto the shaft 311 of the stepping motor 31. A plurality of small holes 322 are provided at the outside rim of the support plate 32 corresponding to the screw holes 334 on the lens bracket 33, and a plurality of hold-down plates 323 are projected corresponding to the window opening 332 on the lens bracket to lock with the lens bracket 33 as being an integrated part vis-a-vis the whole by the screws 37 through the small holes 322 and to clamp firmly the lens 34 inserted into the window 331 by means of the hold-down plate 323 to seal up the opening 332 at the top rim of the window 331 of the lens bracket 33.

Figure 4:
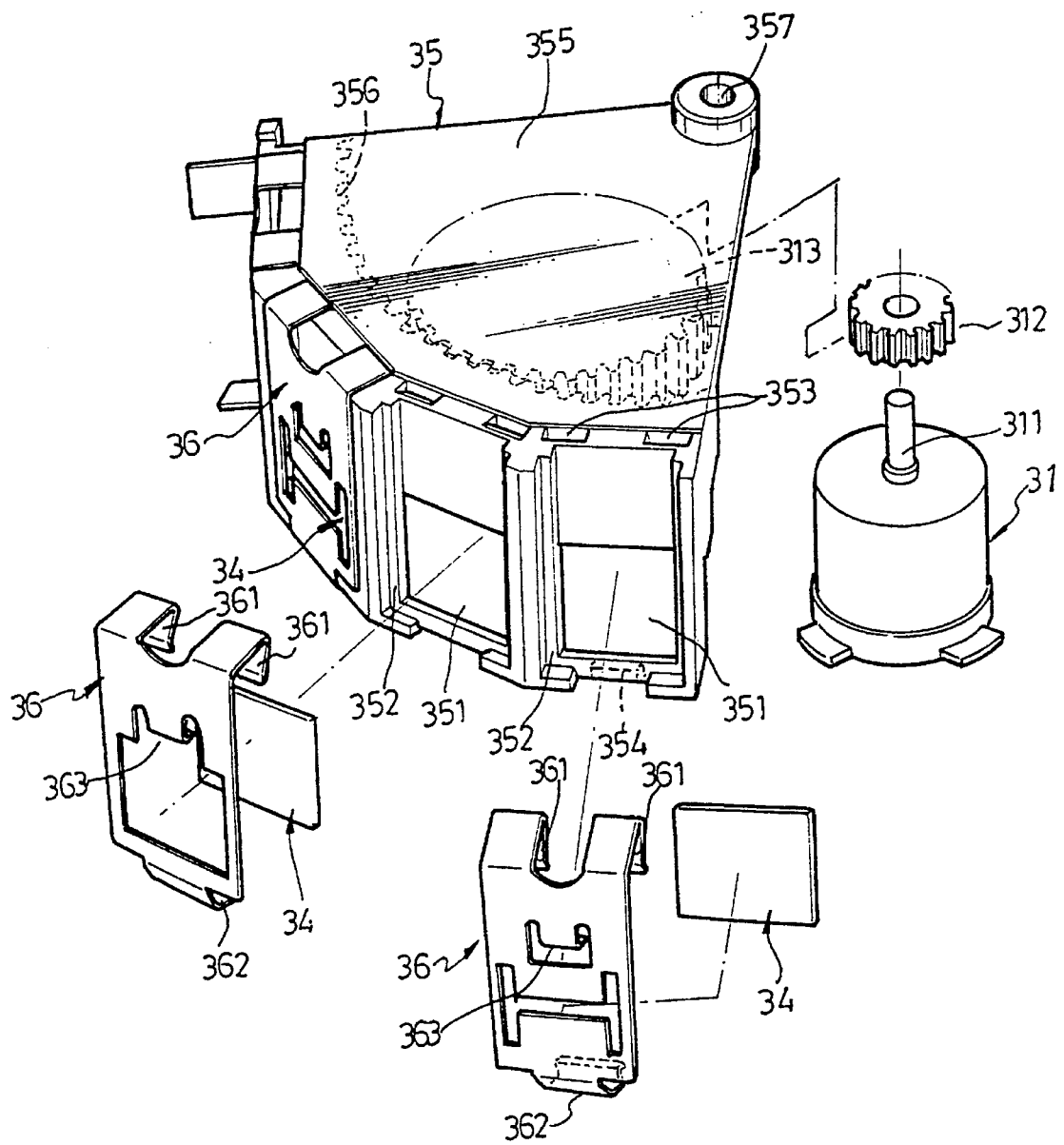
FIG. 4 is an exploded view of the structure of the prior art.

Based on the above, the light filtering lens assembly of the present invention is able to achieve easily the purpose of locking positively and firmly with a few pieces of screws 37 and reduce the chance of the lens 34 from being touched by hand during assembling as well as save the manufacturing cost of the commonly known metallic lug piece 36 (as shown in FIG. 4). Further in the transmission aspect, the present invention makes use of the stepping motor 31 to drive the assembly of support plate 32 and lens bracket 33 directly to eliminate the working time and expenses of providing the inner toothed gear sector 356 inside the lens bracket and additional manufacturing of the idler 313 and pinion 312 commonly known construction (as FIG. 4) to achieve the goal of reducing the cost further.

Although the present invention has been described in connection with the preferred embodiment thereof, many other variations and, modifications will now become apparent to those skilled in the art without departing from the scope of the invention. It is preferred, therefore, that the present invention not be limited by the specific disclosure herein, but only by the appended claim.

What is claimed is:

1. A lens assembly installation of scanner comprising a slide base being movable to and fro inside the scanner body horizontally and longitudinally on which is mounted a projection lamp, a light filtering lens assembly and a camera, characterized in that said light filtering lens assembly includes a stepping motor, a support plate, a lens bracket and four pieces of lens; said stepping motor being provided with a shaft; said lens bracket being shaped as a circular arc wherein four windows are disposed one-by-one parallelly, having a plurality of screw holes disposed at the top; said windows each having an opening at the top thereof and having a U-channel in the inner rim thereof to accomodate said lens pieces;

said support plate having a shaft hole by which said support plate is fixed onto said shaft of said stepping motor, further having a plurality of small holes disposed at the outer rim thereof, corresponding to said screw holes of said lens bracket, said support plate further having a plurality of projected hold-down plates corresponding to said windows of said lens bracket, and being locked with said lens bracket as being an integrated part vis-a-vis the whole.

* * * * *